D. R. RICHIE.
TRACTIVE LUG.
APPLICATION FILED JULY 15, 1920.

1,395,997.

Patented Nov. 1, 1921.

WITNESS
F. J. Hartman

INVENTOR
David R. Richie.
BY Blount, Moulton & Holbert
ATTORNEYS

UNITED STATES PATENT OFFICE.

DAVID R. RICHIE, OF LANSDOWNE, PENNSYLVANIA, ASSIGNOR TO S. L. ALLEN & CO., INC., A CORPORATION OF PENNSYLVANIA.

TRACTIVE LUG.

1,395,997.  Specification of Letters Patent.  Patented Nov. 1, 1921.

Application filed July 15, 1920. Serial No. 396,367.

*To all whom it may concern:*

Be it known that I, DAVID R. RICHIE, a citizen of the United States, and a resident of Lansdowne, county of Delaware, State of Pennsylvania, have invented certain new and useful Improvements in Tractive Lugs, of which the following is a specification, reference being had to the accompanying drawing.

My invention relates to tractive lugs employed for increasing the tractive effort of self-propelled vehicles and is more particularly adapted for employment in connection with agricultural tractors with which, under certain conditions of operation, it is requisite to employ some form of gripping means on the traction wheels to insure a maximum tractive effect.

The principal object of my invention is the provision of means adapted for ready attachment to the traction wheels of a tractor or the like for the purpose of increasing their tractive effort, and which when in position on the wheels, will be firmly secured in proper operative relation with respect thereto; which may be readily removed from the wheel when desired by the removal of but a single nut; which are of sturdy construction, not liable to be damaged in operation, and which may be manufactured cheaply and sold at a relatively low price.

Other objects of my invention are the provision in a tractive lug adapted for increasing the tractive effort of a tractive wheel of means whereby when the lug is positioned on the rim of the traction wheel it will be prevented from relative movement with respect thereto, and which will present a surface of such character for contact with the wheel rim that the same lug may be utilized with wheels of varying diameters or uneven surfaces; which is of a shape to exert maximum tractive effort when in operative position on the wheel and which may be attached to or removed therefrom with a minimum amount of labor.

My invention further includes all of the other various objects and novel features of construction and arrangement hereinafter more definitely specified and described.

Figure 1:
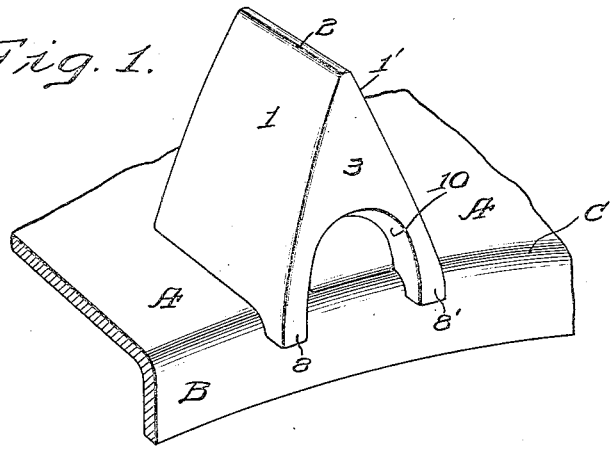
Figure 2:
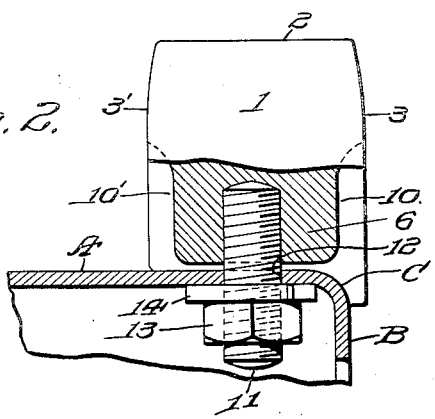
Figure 3:
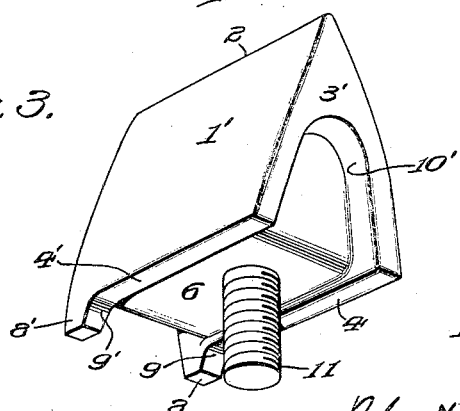

In the accompanying drawing, Figure 1 is a perspective view of a preferred embodiment of my invention in operative position upon a tractor wheel, shown fragmentarily; Fig. 2 is a side elevation of the lug partially broken away into vertical central section, the wheel rim also being shown in transverse section, and Fig. 3 is a perspective view of the lug removed from the wheel rim, like numerals being employed to designate corresponding parts in the various figures.

Referring to the drawing, the lug therein shown comprises a body having sides 1—1' which converge upwardly from the base to an apex or point of juncture 2 and which may preferably be plane. The respective ends of the lug 3—3' may also preferably curve slightly inwardly as they approach the apex 2, so that in general form or contour the lug may be considered as substantially of wedge shape with preferably slightly inwardly curved ends. In order to afford a firm seat on the tread of the wheel rim A, I prefer to provide the base of the lug with a pair of substantially parallel ridges or ribs 4—4' adjacent the lower extremities of the sides 1—1', the surface of the main portion 6 of the base between the ridges lying in a plane slightly spaced below the plane of the surface of the latter, so that when the lug is positioned on the rim, the ridges only will contact therewith. By so arranging the base of the lug I provide substantially two narrow parallel lines of contact between the lug and the rim A and hence even though the surface of the rim be uneven or whatever be the radius of curvature of the latter within limits, the lug will firmly seat upon the rim with the main portion 6 of its base out of contact therewith and thus have no tendency to wabble laterally with respect thereto when secured in position thereon.

For the purpose of assisting in maintaining the lug in rigid operative relation with the rim, I provide means integral with the body of the lug adapted to overhang the edge of the rim and to rest in contact therewith when the lug is in operative position, said means preferably comprising spaced lips 8—8' formed integral with the body of the lug adjacent one end thereof and depending below the ridges 4—4', said lips conveniently being of substantially the width of the ribs and in effect forming continuations thereof. Since it is frequently customary to employ pressed steel rims for traction wheels of the character of those to which the lugs are ordinarily attached, such wheels having peripheral flanges B on either side of the tread and integral therewith whereby a curved connecting surface or corner C is presented between the flange and the tread, I prefer, when the lugs are to be used with a wheel rim of this character, to curve the inner surfaces 9—9' of the lips in correspondence with the curve of said connecting surface C so that when the lug is positioned on the wheel it will contact therewith along the ribs 4—4' and the curved surfaces 9—9', the extremities of the lips preferably terminating at about the termination of the curved connecting surfaces.

In order to lighten the lugs and effect a saving of metal in their manufacture without impairing their efficiency of operation, I prefer to depress or cut out a portion of the ends 3—3' of each lug adjacent the base thereof so as to form at each end a substantially semi-circular recess 10—10' extending from the surfaces of the ridges 4—4' approximately half way to the apex 2, thus in no way diminishing the area or extent of the tractive surfaces 1—1' of the lug but materially diminishing its weight. However, if desired, these recesses or cut out portions may be omitted, or the weight of the lug decreased in some other suitable and convenient manner.

For the purpose of securing the lug in operative position on the rim, suitable means are provided which may conveniently comprise, as shown in the drawing, a stud 11 positioned approximately at the center of the main portion 6 of the base of the lug and extending outwardly therefrom. The stud is fixedly secured in the lug in any convenient way, for example, by screwing it into a suitable threaded bore formed in the lug or by positioning it in the mold in which the lug is cast and then pouring in the metal from which the lug is formed so that the stud will be cast in position in the lug, or in any other suitable manner.

It will be understood that the rim A is provided with a plurality of apertures 12 suitable for the passage of the studs of the lugs, of which any desired number may be employed, the various apertures being so disposed that when the studs are passed therethrough the surfaces 9—9' of each lug will contact with the curved connecting surface C between the flange B and the tread of the rim. Hence when a nut 13 is threaded onto the projecting portion of the stud and drawn up either directly against the under surface of the rim, or preferably against a lock washer 14 disposed between the nut and the rim, the lug will be firmly held in position on the rim and prevented from any relative movement either axially about the stud or in any other direction with respect thereto. It will be observed that the lug may be attached or detached from the rim merely by the positioning or removal of a single nut and that when operatively secured on the rim the lug to all intents and purposes forms an integral part thereof; is incapable of any relative movement with respect thereto and is of a form to afford a maximum tractive effect while requiring a minimum amount of power to force it into the ground during the revolution of the wheel.

While I have herein described and illustrated a preferred embodiment of my invention, I do not thereby desire or intend to specifically limit myself thereto as various changes and modifications may be made in the design and construction of the lug and the latter may be formed in any suitable way, such as by casting or otherwise, and the stud or other fastening means secured in the lug in any desired manner without departing from the spirit and scope of the invention as defined in the appended claims.

Having thus described my invention, I claim and desire to protect by Letters Patent of the United States:

1. A tractive lug comprising a substantially wedge-shaped body having converging sides and substantially parallel ends and a pair of lips adjacent one of said ends and extending beyond said sides adapted to contact with the edge of a wheel rim when said lug is in operative position thereon.

2. A tractive lug comprising a substantially wedge-shaped body having converging sides, spaced lips adjacent one end of the lug projecting beyond the lower extremities of and adapted to contact with the edge of a wheel rim when said lug is in operative position thereon and a pair of parallel ribs adjacent the extremities of said sides adapted to contact with the surface of said rim.

3. A tractive lug of substantially wedge-shaped form having overhanging lips adjacent one end thereof, a threaded stud adapted to extend through a wheel rim and a pair of spaced substantially parallel ribs adjacent the sides of the lug adapted to contact with said rim when said stud is positioned thereon.

4. A tractive lug comprising a body portion, a pair of spaced overhanging lips adjacent one end thereof, means for securing said lug to a wheel rim and spaced surfaces adjacent the sides of said body adapted to rest on said rim when said lug is positioned thereon.

5. A tractive lug comprising a body portion, means for securing said lug to a wheel rim, a pair of spaced surfaces adjacent the base of the lug adapted to contact with the tread of the wheel and a pair of spaced overhanging lips adjacent said surfaces adapted to overhang and contact with the edge of said rim when the lug is secured thereon.

In witness whereof I have hereunto set my hand this 14th day of July, A. D. 1920.

DAVID R. RICHIE.